UNITED STATES PATENT OFFICE.

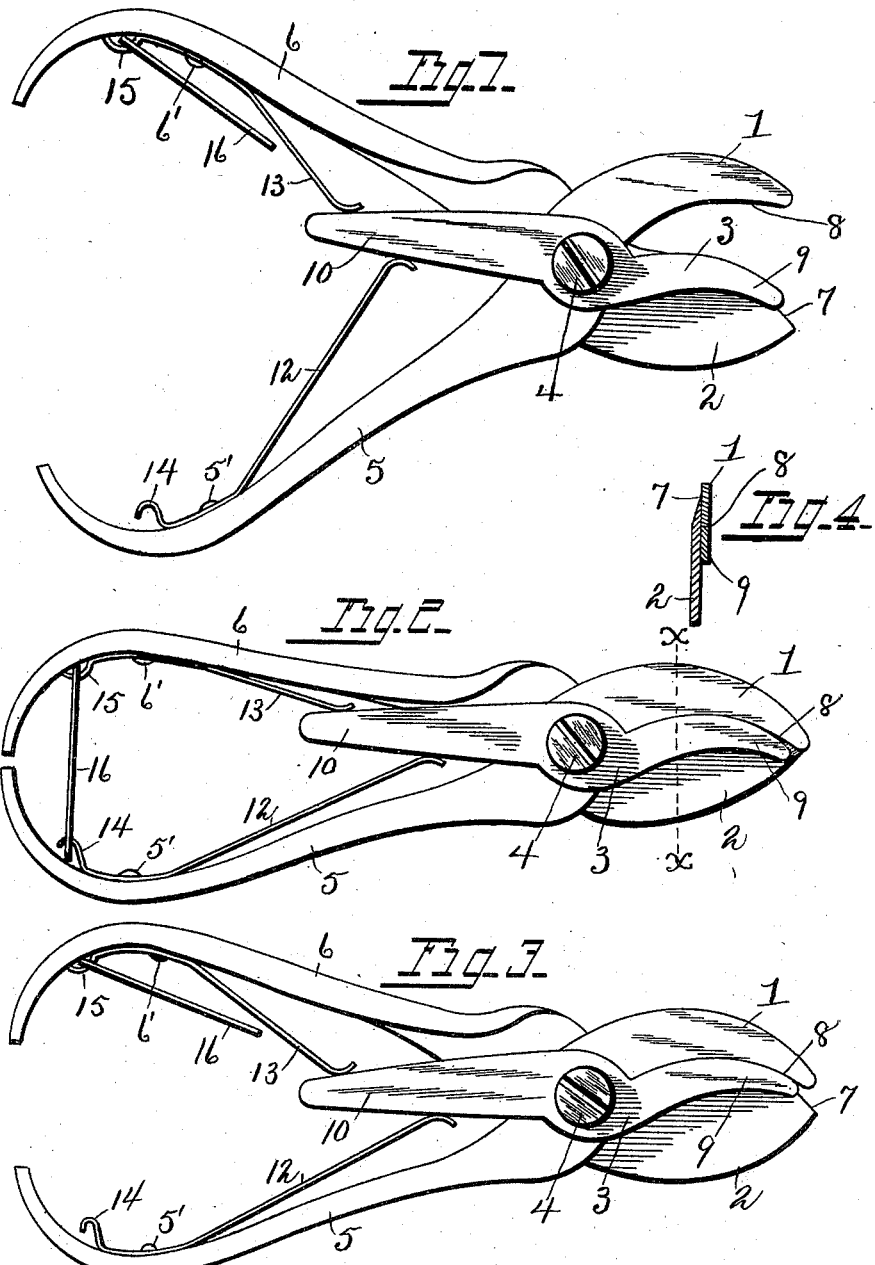

VANRENSELAER W. KELLY, OF FREMONT, OHIO.

GRAPE-SHEARS.

SPECIFICATION forming part of Letters Patent No. 579,093, dated March 16, 1897.

Application filed January 23, 1897. Serial No. 620,394. (No model.)

*To all whom it may concern:*

Be it known that I, VANRENSELAER W. KELLY, of Fremont, county of Sandusky, and State of Ohio, have invented certain new and useful Improvements in Grape-Shears; and I do hereby declare that the following is a full, clear, and exact description of the invention, which will enable others skilled in the art to which it appertains to make and use the same, reference being had to the accompanying drawings, and to the numerals of reference marked thereon, which form part of this specification.

My invention relates to a grape-shears, having especial relation to a device which can be used as a grape-picker or a shears for general use for severing stems or the limbs of bushes and trees, where the parts severed can be held by the shears until released by the operator.

The invention consists in a shears, which may be of any of the well-known constructions, the pivot-pin of which carries a holding-bar, one end of which is of a similar contour to the cutting edge of one of the shear-blades, the opposite end being held suspended between the handles of the shears by springs which are of different resilience.

The invention further consists in the parts as shown, described, and claimed.

In the drawings, Figure 1 illustrates in side elevation the shears shown as opened. Fig. 2 is a similar view, the shears being closed. Fig. 3 is a similar view, the shears being partially closed to simultaneously hold the stem or limb at the commencement of the cutting operation. Fig. 4 is a sectional view taken at a point indicated by lines $x$ $x$, Fig. 2, illustrating the cross-section of the shears and holding-blade.

1 and 2 designate the shear-blades, and 3 designates the holding-blade, these parts being held in assembled and pivotal relation to each other by the pivot-screw 4.

The shear-blades 1 and 2 may be of any of the well-known or preferred constructions, and are provided with handles 5 and 6, respectively, extending rearwardly therefrom.

The blade 2 is provided with a cutting edge 7, and blade 1 is provided with a shoulder 8, with which the cutting edge acts to sever the stem between the same when the handles are brought together. Blade 3 consists of a forwardly-extending clamping portion 9 and a rearwardly-extending portion 10. The forwardly-extending portion 9 acts as a jaw to coact with the shoulder 8, each of which are of the same contour, to hold the stem after it has been severed by the cutting edge 7 of the blade 2.

Secured to the rear end of the handles 5 and 6 by rivets 5' and 6' are springs 12 and 13, respectively, the forward free end of the springs bearing upon opposite sides of the rear extension 10 of the holding-blade 3. The springs are of different resilience, the spring 12 being of greater length than the spring 13, whereby when the handles are closed the action is first that the spring 12 will give to allow the blade 3 to turn on its pivotal point until the clamping portion 9 abuts against and clamps the stem against the shoulder 8 of the blade 1. During this operation the spring 13 remains stationary, as it has a sufficient resiliency to force the blade 3 into the position shown in Fig. 3 and against the tension exerted by the spring 12. When the stem is clamped between the blade 1 and the clamping portion 9, the blade 3 is at the extent of its movement, and a further compression of the handles will force back the spring 13 and allow the blade 2 to pass beyond the shoulder 8, as shown in Fig. 2, and sever the stem, when the shears, which still retains the stem, may be held over any desired receptacle, when, by opening the shears, the stem is released and the matter carried thereby is dropped into the receptacle.

In order to hold the shears closed when not in use, the rear end of the spring 12 may extend beyond the rivet 5' and be provided with a hook 14, and the spring 13 may also be extended beyond the rivet 6' and be provided with a loop 15, which carries a link 16, the opposite end having an orifice to engage with the hook 14. The rear end 15 of the spring 13 has a resiliency to act upon the link 16 similar to the action of a spring upon the blade of a knife to hold the link parallel with the handle 6 when the shears is in operation, whereby the link is always held out of the way of the operator while in the act of using the shears.

What I claim is—

1. In a shears of the class described, shear-blades and a clamping-plate pivotally secured together, handles extending rearwardly from the shear-blades, and a rearward extension upon the clamping-plate extending rearwardly between the handles, springs secured at one end to each of the handles, the opposite ends bearing against the extension of the clamping-plate with different tensions and upon opposite sides of the same.

2. In a shears of the class described, shear-blades and a clamping-plate carried by a common pivot, handles extending rearwardly from the shear-blades, one of the shear-blades having a cutting edge, the opposite one being formed with a shoulder, a clamping-plate having a forward extension of the same contour of the shoulder upon one of the shear-blades, a rearwardly-extending projection extending between the handles and the shear-blades, springs secured to the handles at one end, the opposite ends bearing against the opposite sides of the rearward extension of the clamping-plate at different points longitudinally of the same, whereby pressure of one spring upon the extension is greater than that of the pressure exerted by the opposite spring.

In testimony that I claim the foregoing as my own I hereby affix my signature in presence of two witnesses.

VANRENSELAER W. KELLY.

Witnesses:
R. P. BUCKLAND,
STEPHEN BUCKLAND.